THOMAS O. SUMMERS, INVENTOR.

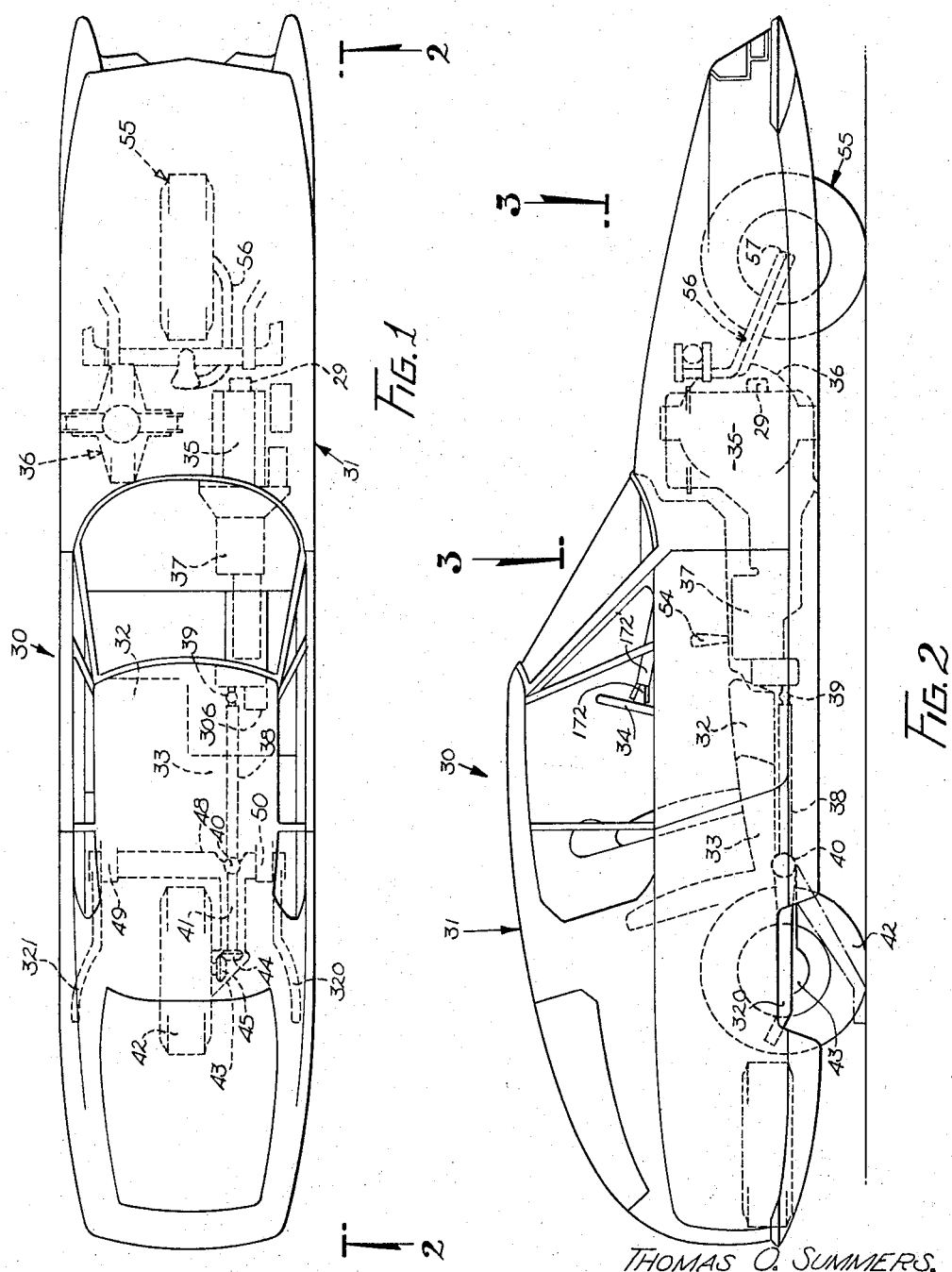

BY R. E. Geauque
ATTORNEY

THOMAS O. SUMMERS,
INVENTOR.

BY R. E. Geange
ATTORNEY

March 19, 1968     T. O. SUMMERS     3,373,832
GYRO VEHICLE
Filed April 19, 1966     9 Sheets-Sheet 4
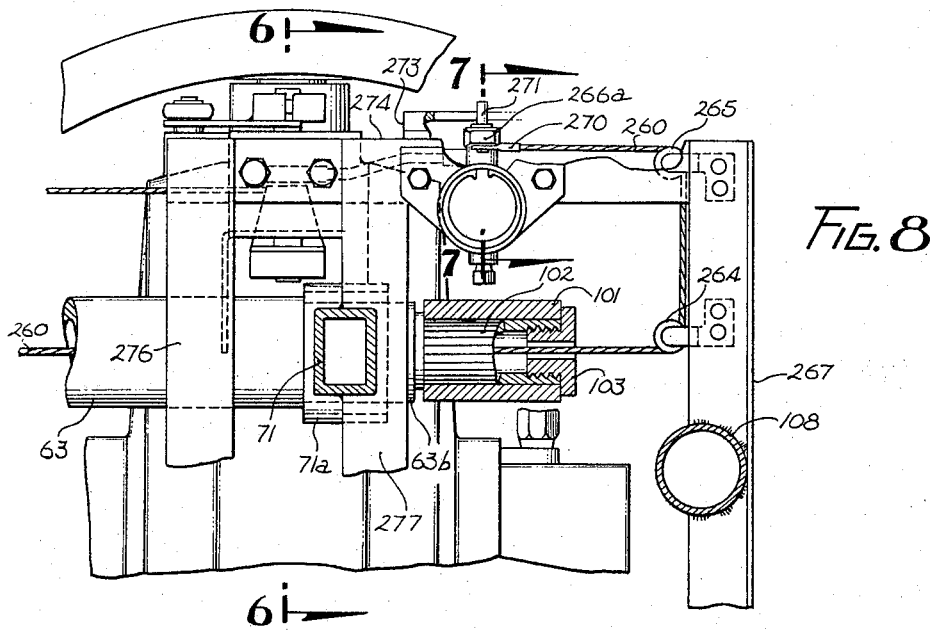
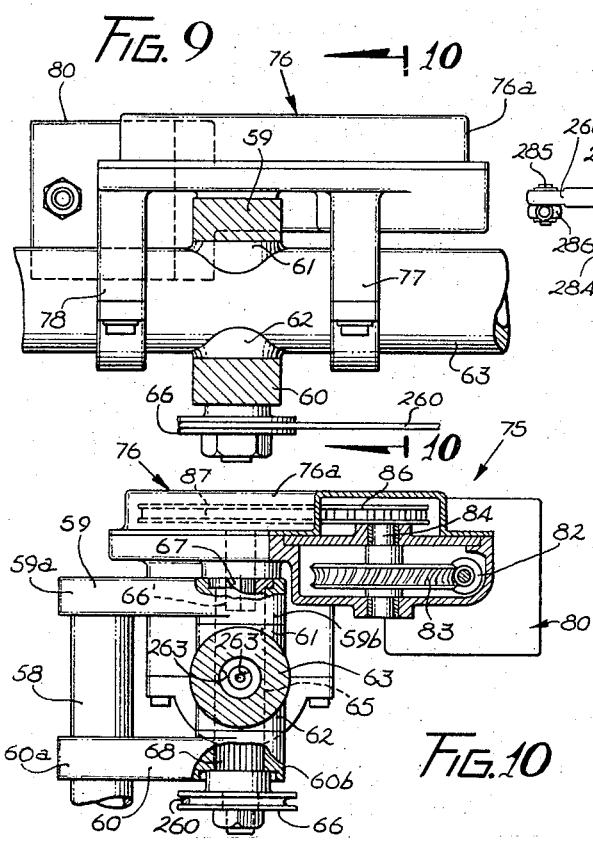
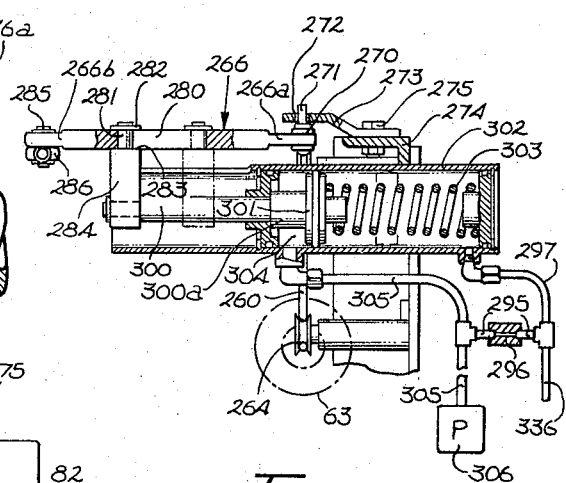
THOMAS O SUMMERS,
INVENTOR.
BY R. E. Geauque
ATTORNEY

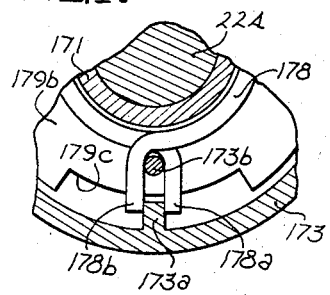
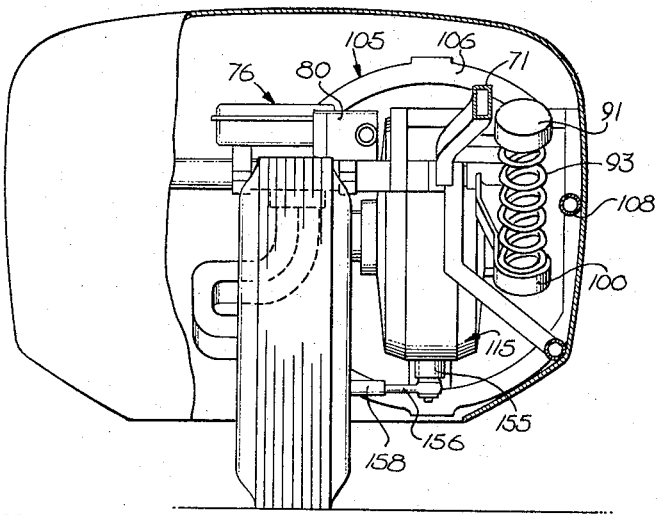
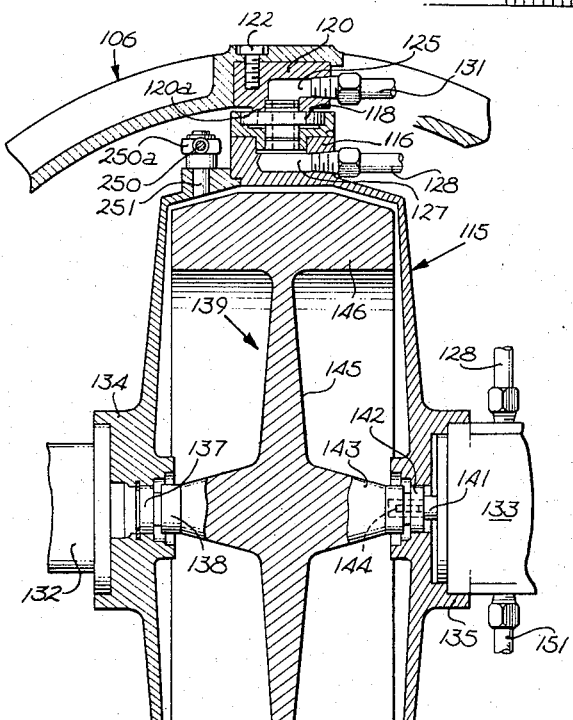
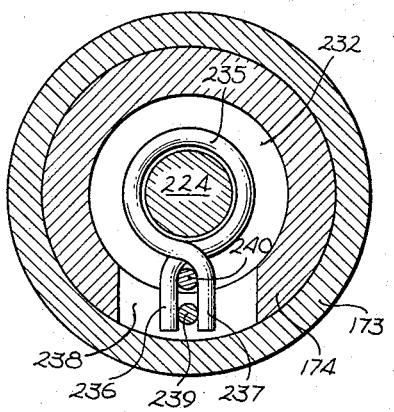
Fig. 11
Fig. 17
Fig. 12
Fig. 16
THOMAS O. SUMMERS, INVENTOR.
BY R. E. Jeaugue
ATTORNEY

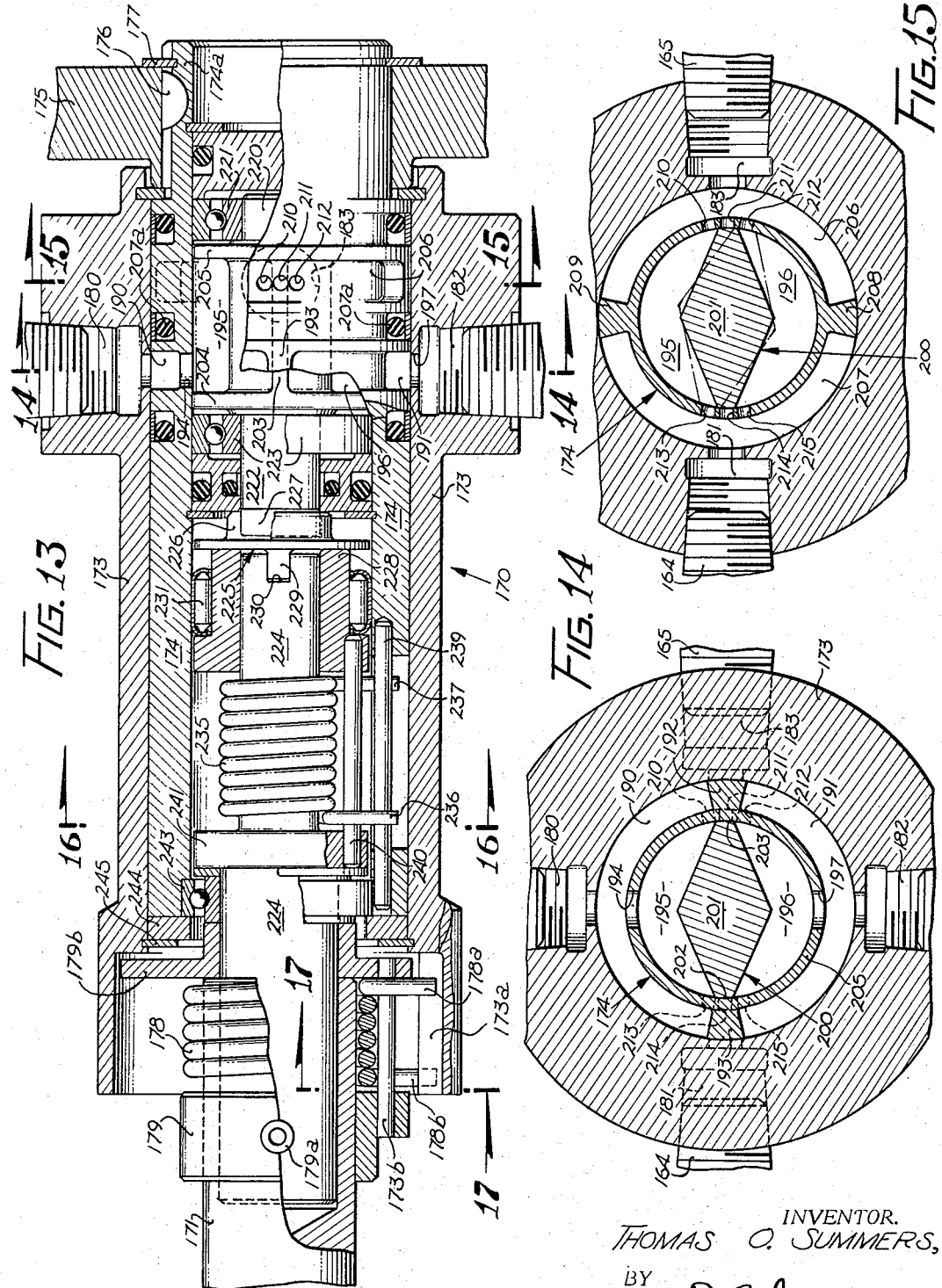

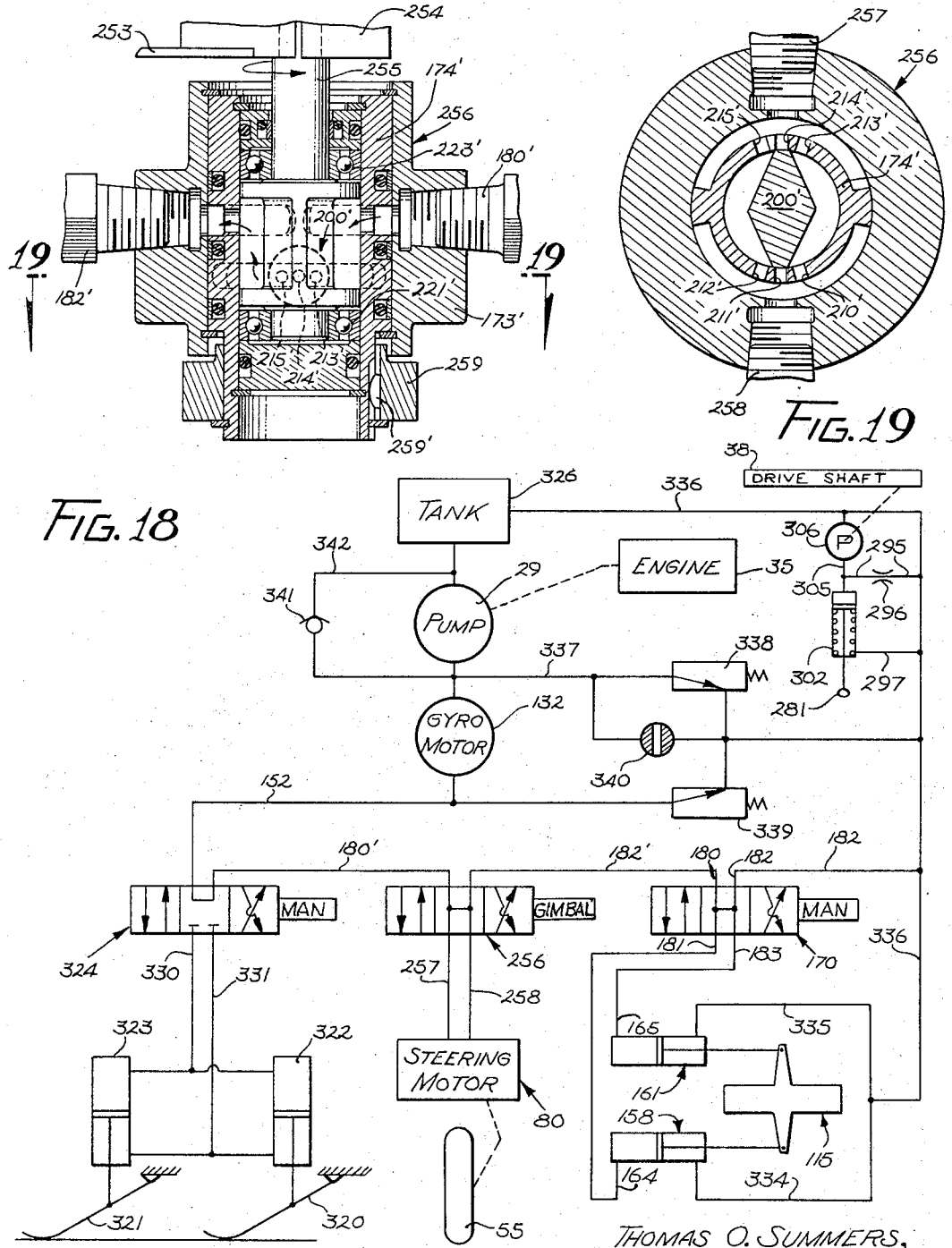

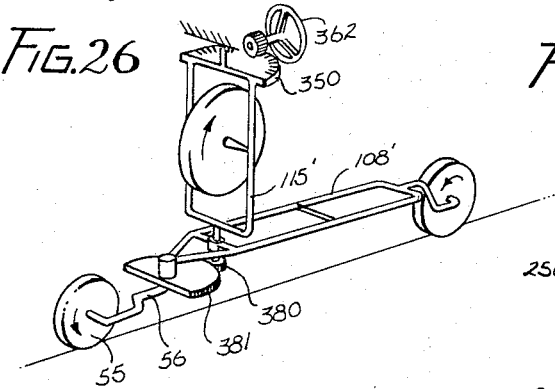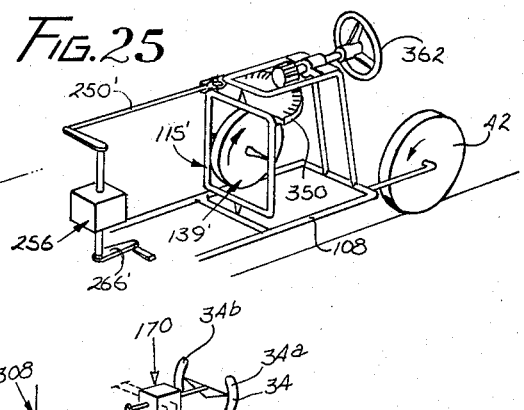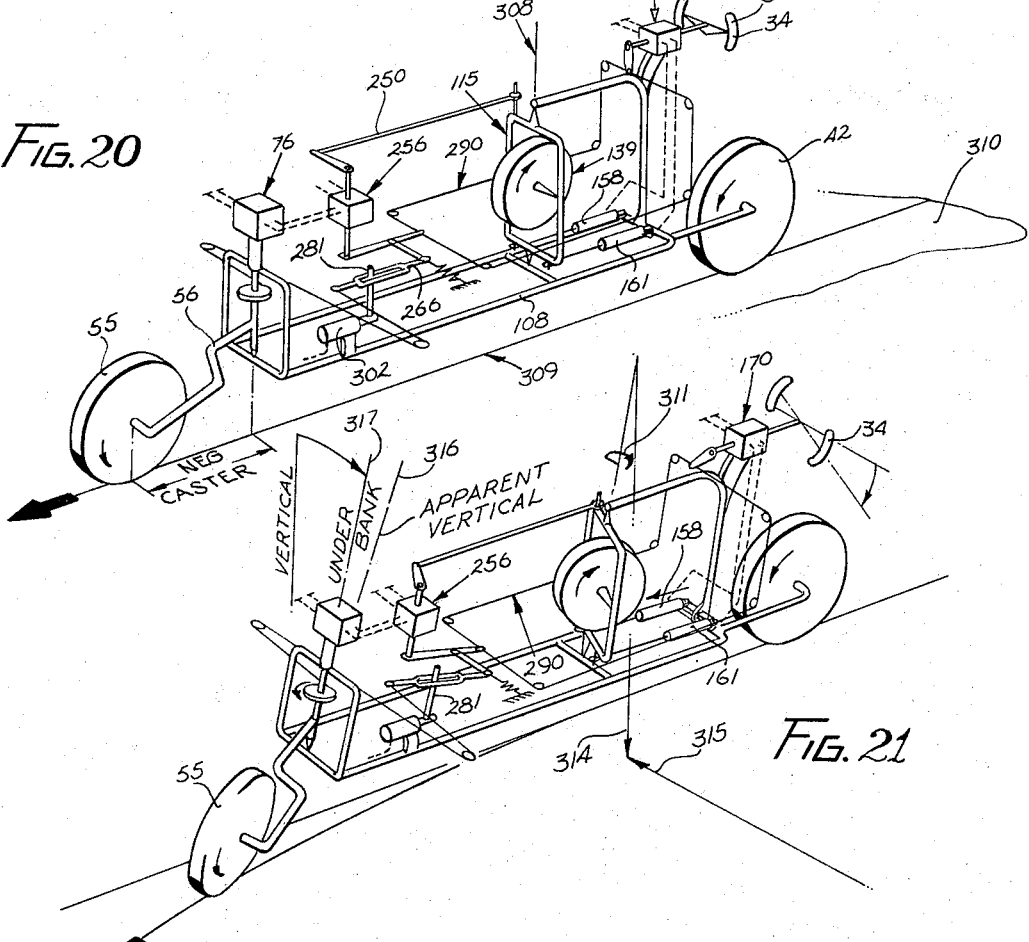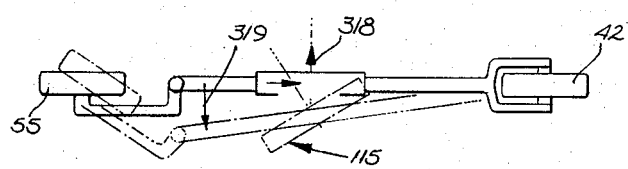

THOMAS O. SUMMERS,
INVENTOR.

BY R. E. Geauque
ATTORNEY 3,373,832
GYRO VEHICLE
Thomas O. Summers, Sherman Oaks, Calif.
(1536 Fairway Drive, Camarillo, Calif. 93010)
Filed Apr. 19, 1966, Ser. No. 543,708
42 Claims. (Cl. 180—30)

This invention relates to gyroscopically stabilized vehicles and particularly to gyroscopically stabilized center-tracking automotive vehicles supported on running wheels arranged in tandem to allow substantial attitude variations or banking freedom about a roll axis passing through the points of contact of the wheels with the ground.

When a conventional tandem wheeled center-tracking vehicle, such as a motorcycle, is at rest or is moving in a straight line, gravity determines the equilibrium position of the center of mass of the laden vehicle; that is, the vehicle proper, plus its load. In its balance position, if the line of action of gravity is represented by a vertical ray originating at the center of mass, the vertical ray will intersect the roll axis. In any other position, a force moment is produced about the roll axis with the magnitude of the moment being in direct proportion to the lateral displacement of the vertical ray from the roll axis.

When a conventional two-wheeled vehicle is moving along a curved path, various forces determine the equilibrium position of the laden vehicle about the roll axis. To insure equilibrium the roll moments produced by gravity, lateral acceleration (centrifugal inertia force) and other forces must add vectorially to zero.

Disregarding these other forces, a laden vehicle, under the influence of gravity and centrifugal force, is in equilibrium only if a ray originating at its center of mass and representing the line of action of the resultant of gravity and centrifugal force, passes through the roll axis. In this situation, the lateral tilt of this ray from the vertical, that is, the bank angle of the laden vehicle, is equal to the angle a plumbline is displaced from vertical under the identical influence of gravity and centrifugal force.

Influences in addition to gravity and centrifugal force may alter the laden vehicle's equilibrium bank angle relative to the plumbline angle or apparent vertical. In a high speed turn, for example, the gyroscopic effect of the running wheels produces a gyro moment about the roll axis in the same direction as the moment produced by centrifugal force. In a conventional two-wheeled vehicle, this gyro moment can be equilibrated by allowing the laden vehicle's bank angle to exceed the plumbline angle by the amount necessary to establish roll equilibrium. This overbank, or increase in the bank angle, correspondingly increases the roll moment produced by gravity acting on the mass particles of the laden vehicle, which moment is opposite in direction to the gyro moment.

Unlike this gravity roll moment which is determined by the laden vehicle's bank angle, the roll moment produced by centrifugal force is determined by the displacement of the vehicle's steered front wheel and handlebars. The cyclist steers the front wheel in one direction to roll his vehicle in the other.

A conventional two-wheeled vehicle such as a motorcycle may be guided by controlling its bank angle with roll moments effected by such steering or handlebar displacement. To turn left, the handlebars or roll control means are turned first to the right. The resulting centrifugal force moment effects a left roll. As the vehicle rolls left toward a bank angle appropriate to the desired left turn path, the handlebars and front wheel are turned back and to the left of their normal or center position, to reverse the centrifugal force moment and stop the roll. To effect a coordinated right turn, the procedure is reversed.

Another method of banking into a turn is for the cyclist to shift his own weight laterally relative to the plane of symmetry of the vehicle proper. This shifts laterally the center of mass of the laden vehicle. In this situation the bank angle of the laden vehicle will be greater than the bank angle of the plane of symmetry of the vehicle proper and the gravity moment will be in the direction the cyclist leans or shifts his weight. To turn left, the cyclist leans left. This starts a left roll which the cyclist stops with centrifugal force by turning the handlebars or roll controller to the left. To turn right the procedure is reversed. The effectivity of the body lean method of controlling roll, however, is limited to the extent to which the cyclist can shift his body laterally.

Caster shifts laterally, according to front wheel displacement, the center of mass of the laden vehicle relative to the roll axis. Mass shift effected by conventional or positive front wheel caster is toward the inside of the turn and augments mass shift effected by roll and/or body lean, so that less lateral tilt of the vehicle's plane of symmetry is required to effect a given bank angle of the laden vehicle.

In a coordinated turn, the roll moment due to positive caster is opposite in direction to the roll moment due to centrifugal force, and for a given front wheel displacement the combination of these moments tend to roll the vehicle in one direction at zero and near zero speeds, and in the opposite direction at high speeds. Below the crossover speed the gravity moment due to positive caster exceeds the centrifugal force moment due to front wheel displacement, and the cyclist may find it necessary to augment the centrifugal force moment by shifting his own weight toward the outside of the turn.

Indeed, in certain high speed, narrow, enclosed motorcycles, in which the cyclist cannot lean his body appreciably, retractable outrigger side supports are used to hold the vehicle upright below the crossover speed. This crossover, or minimum control speed is a function of positive front wheel caster.

Although such caster raises the minimum speed at which equilibrium can be maintained by ordinary methods, it is nevertheless considered desirable in conventional two-wheeled vehicles because it effects a front wheel torque tending to center the roll controller. This centering torque is relied on to assist the cyclist in controlling a conventional two-wheeler.

The gyro stabilized vehicle of the present invention employs front wheel caster, but it is a negative caster. Negative caster, unlike positive caster, facilitates stabilization at zero and near zero speeds, making it unnecessary for the vehicle of the present invention to be in motion to maintain equilibrium. The gyro vehicle's steered front wheel is positioned by a steering motor or servo which renders the roll controller immoble to caster torque so that steering wheel centering torque due to caster is without effect on the vehicle.

The basic stabilizing apparatus of the vehicle according to the present invention employs a large gyro rotor supported in a frame on bearings allowing high speed rotor spin. The gyro gimbal or frame, in turn, is pivotally supported about an axis preferably at right angles to the spin axis, on anti-friction bearings fixed to the chassis of the vehicle so that the pivot axis of the gyro frame is preferably at right angles to the roll axis of the vehicle. The arrangement is such that the gyro and the vehicle have a common roll axis, for example, a line through the points of contact of the running wheels of the vehicle with the support surface, so that neither the gyro nor the vehicle can roll independently of the other.

The pivot axis of the gimbal may be located in any position perpendicular to the roll axis; but its preferred location is parallel to the vehicle's centerplane. When the gyro gimbal axis is fixed in this ideal location, turns can be made with equal facility in either direction and only when it is fixed in this location. Also, in other locations, pitching of the vehicle may disturb steering. When the gyro is in its normal and most effective stabilizing position, its spin axis is at right angles to the roll axis. It is understood that when the various axes are referred to as being at right angles, or perpendicular to each other, they may in fact be offset or spaced with respect to one another so that they do not actually intersect.

So long as the gyro is free to precess about its gimbal axis and is maintained at or near its normal and most effective stabilizing position, the vehicle cannot be rolled by force applied about its roll axis. The gyro responds to such force by precessing about its gimbal axis, for example, as a function of lateral displacement of the center of mass of the laden vehicle with respect to apparent vertical. This precession will be in one direction when the vehicle's center of mass is displaced to the left of apparent vertical and in the other direction when the vehicle's center of mass is displaced to the right of apparent vertical. In other words, the direction and rate of gyro precession about its gimbal axis is determined by the bank angle of the laden vehicle with respect to apparent vertical. The vehicle's bank angle is manually controlled by torquing the gyro about its gimbal axis, and apparent vertical is automatically controlled by servo positioning of the steered front wheel according to the displacement of the gyro from its normal position; that is, the position at which the spin axis is perpendicular to the roll axis.

In turns, therefore, roll moments produced by lateral acceleration according to front wheel displacement, and roll moments produced by gravity as a function of bank angle, must be coordinated in the proper opposing relationship to keep the gyro from departing excessively from its normal position. Time is required to effect such coordination and control of gyro precession and during this time, the gyro will depart from its normal position. This time lag must be kept low to contain gyro displacement within tolerable limits.

In the gyrocar of the present invention, this time lag is minimized by steering the front wheel with a high response steering servo. This servo positions the front wheel automatically as a function of gyro displacement from its normal position. Roll torque is produced according to the lateral acceleration resulting from the gyro controlled front wheel displacement. To initiate a turn, the weight of the gyrocar is shifted laterally by banking in the direction of the desired turn. This produces a roll moment due to gravity which precesses the gyro. The resulting gyro displacement is accompanied by a proportional displacement of the steered front wheel. This causes a turn or lateral acceleration of the vehicle, producing a centrifugal force moment proportional to lateral acceleration and in opposition to the gravity moment. Until the gravity moment is equilibrated, the gyro displacement, front wheel displacement, lateral acceleration and the centrifugal inertia force moment, increase. This decreases the precession rate until proper coordination or equilibrium is achieved and precession stops relative to the vehicle.

In known steerable, gyro stabilized, tandem wheeled vehicles, it has been the common practice to initiate turns by displacing the steerable front wheel without first banking. The resulting lateral acceleration imposes a roll moment on the vehicle, and an attempt is made to shift the weight of the vehicle laterally, by banking or other means, to achieve roll equilibrium before the vehicle upsets. In a severe turn entered suddenly, this effort may be unsuccessful due to the inertia of the mass being shifted.

In the gyrocar of the present invention, the steering movement of the front wheel may be effected directly by the gyro through linkage or gearing providing the gyro with a high mechanical advantage over the steered wheel. This mechanical advantage, in effect, renders the gyro insensitive to torques about the steering axis due to road shock and negative caster.

Preferably, however, the work of positioning the steered front wheel is performed by steering mechanism comprising a gyro controlled servo motor. In either event, gyro precession is followed automatically by a related steering movement until the corresponding change in lateral acceleration stops gyro precession relative to the vehicle which, in turn, stops the steering movement.

In a turn, if a laden gyrocar's center of mass were banked to apparent vertical the gyro would, nevertheless, depart from its normal position because of the inherent tendency of such a gyro to remain fixed in space. In a turn, therefore, the laden vehicle's bank angle is not the plumbing line angle. It varies sufficiently from a plumbline angle to produce a roll torque and precess the gyro about its gimbal axis at the same rate that the vehicle is turning. With the gyro oriented in its preferred location; that is, with its pivot axis fixed in a position parallel to the centerplane, the laden vehicle's bank angle in a turn can either be greater or less than the plumbline angle according to the direction of rotor spin.

In this preferred orientation of the gyro, the spin axis is normally parallel to the fixed axis of rotation of the rear running wheel. If the gyro rotor is caused to spin in the same direction that this running wheel rotates when the gyrocar is in forward motion, the laden vehicle's bank angle will be greater than the plumbline angle and the vehicle will overbank for both right and left turns. On the other hand, if the gyro rotor is caused to spin in the opposite direction, the vehicle will underbank for turns in either direction.

The direction in which the gyro rotor spins also determines the direction the front wheel is moved about its steering axis in relation to gyro precession. In an overbanking gyrocar, when the gyro gimbal precesses or pivots to the left, the front wheel steers to the left and when the gimbal precesses to the right, the front wheel steers to the right. In an underbanking gyrocar, when the gyro pivots to the left or right, the front wheel steers to the right or left, respectively.

Generally speaking, steerable wheeled vehicles tend to oversteer when the rear end is heavy and understeer when the front end is heavy. A rear heavy gyrocar which otherwise might oversteer, can be made to steer more naturally by adapting the vehicle to overbank in turns. In oversteering vehicles, there is a tendency for the rear end to run outward more than the front end. This tightens the turn, and requires the driver to steer away from the inside of the turn. This steering reversal or corrective action on the part of the driver must be effected quickly to restore control should the rear end break outwardly or skid. This corrective action is facilitated in a rear heavy gyrocar if the gyro rotor spins in the direction resulting in overbank.

In a rear heavy, overbanking gyrocar, the proper response to rear end breakaway is quick and automatic. When the rear end starts to skid outward the gyro automatically moves the front wheel in the direction to steer the vehicle away from the inside of the turn, thus saving the driver from a potentially unstable situation.

In a front heavy understeering vehicle, on the other hand, the front end tends to run wide in a turn. To overcome this tendency, in negotiating a curve the driver must increase the cornering force by excessive inward steering. This corrective action is natural for the average driver since it merely involves steering more sharply in the direction of the intended curve. Should, however, the heavy front end suddenly break away, or skid outwardly, the proper corrective action would require a quick steering reversal. This action can be provided automatically in a front heavy gyrocar by adapting the vehicle to underbank in a turn. In a front heavy, underbanking gyrocar, when the front end starts to skid outward, the gyro automatically steers the front wheel outward; that is, in the direction of the skid.

For a given front wheel displacement, lateral acceleration increases approximately according to the square of the vehicle's speed. At a low speed, therefore, a much larger front wheel displacement is necessary to achieve a given lateral acceleration (centrifugal inertia force) than at a high speed. If the ratio of gimbal movement to front wheel movement is high, and the vehicle speed is low, the gimbal may run out of travel in order to effect a required lateral acceleration or front wheel displacement. On the other hand, if this ratio is low; at high speed, small amplitude gimbal oscillations such as might be caused by random torques due to unbalance and road conditions may result in dangerous lateral accelerations. Therefore, for a gyrocar capable of high speed travel, lateral acceleration or front wheel displacement is controlled automatically by gyro gimbal displacement in a ratio preferably changing approximately as the square of the car's speed, so that for any particular gimbal displacement, the turning radius of the vehicle at high speed is much greater than at low speed.

It is therefore an object of the present invention to provide novel means for imparting stability to an otherwise unstable vehicle.

Another object of the present invention is to provide a gyrocar in which the driver effects turns by torquing the gimbal until the car precesses or banks to a roll attitude corresponding to his desired rate of turn.

Another object of the invention is to provide a gyrocar in which the driver controlled roll precession disturbs the equilibrium of the car and causes the gyro gimbal to precess and automatically alter the displacement of the front wheel about its steering axis in a direction to restore equilibrium.

Another object of the present invention is to provide a gyrocar in which the front wheel has negative caster to move the vehicle sideways relative to its roll axis, when displaced, and produce a gravitational movement augmenting any roll moment due to lateral acceleration. In keeping with this object, the augmenting gravitational moment is maximum at zero speed and minimum at top speed, so that vehicle equilibrium is maintained with more or less equal effectivity throughout the entire speed range.

Another object of the present invention is to provide a gyrocar in which the simple act of steering the car automatically maintains the gimbal in the vicinity of the position at which it is most effective in resisting roll, and in which, when not in motion, the simple act of centering the attitude controller, centers the gimbal to its most effective position.

Another object of the present invention is to provide a center-tracking wheeled vehicle which turns automatically according to roll attitudes controlled by the driver, and in which force moments are controlled automatically to maintain equilibrium in the attitudes the driver establishes.

Another object of the invention is to provide a gyro vehicle in which lateral acceleration or front wheel displacement is controlled automatically by gyro gimbal displacement in a ratio changing approximately as the square of the vehicle's speed.

These and other objects of the invention not specifically set forth above will become readily apparent from the accompanying description and drawings in which:

FIGURE 1 is a top plan view of the gyro vehicle of the present invention showing in dotted lines the location of the various major components of the vehicle;

FIGURE 2 is a side elevational view along line 2—2 of FIGURE 1 showing the rear drive wheel and the front steered wheel;

FIGURE 7 is a vertical section along line 7—7 of FIGURE 5 showing the gain control in the follow-up linkage connected to the front wheel;

FIGURE 8 is a partial transverse vertical section along line 8—8 of FIGURE 6 illustrating the follow-up linkage between the front wheel and the valve connected to the gyro gimbal;

FIGURE 9 is a transverse vertical section along line 9—9 of FIGURE 4 showing the steering mechanism for the front wheel and the follow-up linkage connected therewith;

FIGURE 10 is a vertical section along line 10—10 of FIGURE 9 illustrating the gear drive connected with the steering motor;

FIGURE 11 is a transverse vertical section along line 11—11 of FIGURE 4 showing the steered front wheel suspension;

FIGURE 12 is a transverse vertical section along line 12—12 of FIGURE 4 showing the gyro gimbal supporting the gyro rotor;

FIGURE 13 is a vertical section along line 13—13 of FIGURE 3 showing the valve controlled by the steering wheel (roll controller) shaft for turning the vehicle;

FIGURE 14 is a transverse vertical section along line 14—14 of FIGURE 13 showing the valve spool and follow-up sleeve of the manually controlled valve;

FIGURE 15 is a transverse vertical section along line 15—15 of FIGURE 13 showing a different section of the manually actuated valve;

FIGURE 16 is a transverse vertical section along line 16—16 of FIGURE 13 showing the centering spring for the manually actuated valve;

FIGURE 17 is a partial transverse vertical section along line 17—17 of FIGURE 13 showing the spring for centering the control valve relative to the frame;

FIGURE 18 is a transverse vertical section along line 18—18 of FIGURE 6 showing the valve actuated by the gyro gimbal for controlling movement of the steered front wheel;

FIGURE 19 is a horizontal section along line 19—19 of FIGURE 18 showing the valve elements;

FIGURE 20 is a diagrammatic illustration of the stabilization system for the vehicle steered by the roll controller (steering wheel);

FIGURE 21 is a diagrammatic illustration similar to FIGURE 20 in which the vehicle has been placed in a left turn;

FIGURE 22 is a diagrammatic illustration of the top of the vehicle as shown in FIGURE 20 showing the direction of mass shift due to negative caster;

FIGURE 23 is a schematic illustration of the hydraulic system utilized for the stabilized vehicle and showing side supports for holding the vehicle upright when not in use;

FIGURE 25 is a diagrammatic illustration of a third form of the invention showing the manually operated roll controller (steering wheel) for manually torquing the gimbal;

FIGURE 26 is a diagrammatic illustration of a fourth form of the invention in which the gimbal is mechanically torqued by the steering wheel and the gimbal mechanically steers the front wheel;

First embodiment

Figure 3:
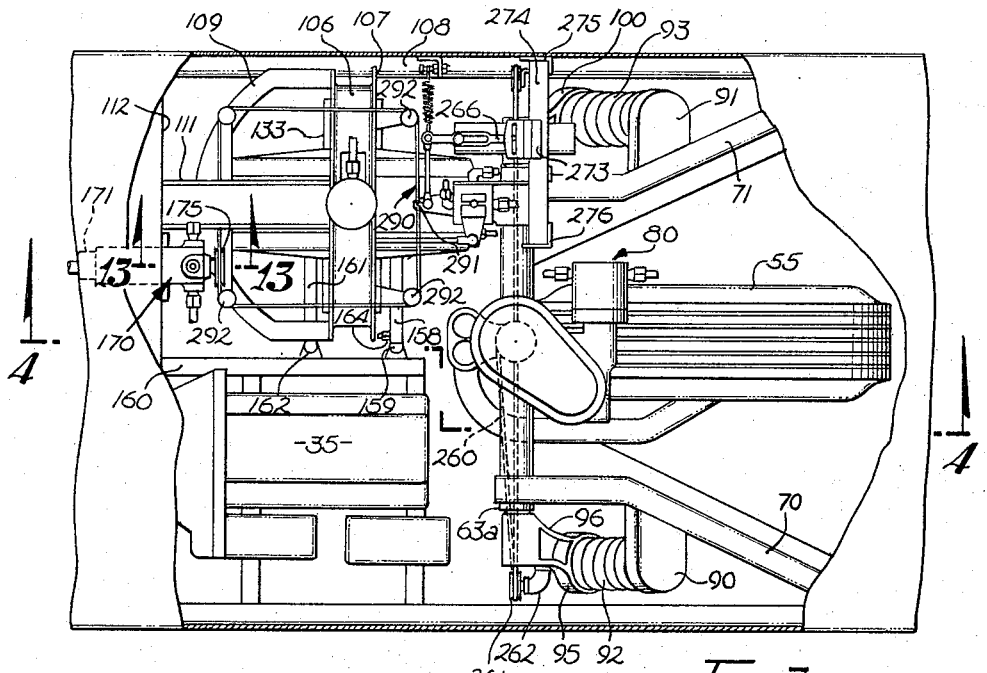
FIGURE 3 is a partial plan view along line 3—3 of FIGURE 2 of the front portion of the vehicle illustrating the steered front wheel and the gyro.

Referring to the first embodiment of the invention illustrated generally in FIGURES 1 and 2, the gyro stabilized vehicle 30 has a body 31 which contains seats 32 and 33 for two passengers sitting side by side with the driver seated behind the roll controller or steering wheel 34. The vehicle can have any suitable type of frame which serves to support an engine 35 and the gyro assembly 36. The engine drives a pump 29 which supplies hydraulic fluid under pressure to the stabilizing components of the vehicle. The engine also drives the transmission 37 which is connected to one end of driveshaft 38 by universal joint 39. The opposite end of the driveshaft 38 connects with universal 40 which in turn connects with shaft 41 leading to the rear wheel 42. The rear wheel 42 and shaft 41 are supported by a frame member 43, and a gear 44 on the end of shaft 41 meshes with gear 45 on the wheel. The member 43 is rigidly connected to a tube 48 which is rotatably supported in brackets 49 and 50 secured to the frame of the car. Thus, rear wheel 42 can move up and down relative to the car frame about the axis of the tube 48 and the universal joint 40 permits the gear 44 to impart a driving force to the wheel regardless of its position relative to the frame. A stick shift lever 54 controls the transmission to control the speed of the car, and a suitable spring support (not shown) may be employed to suspend the rear wheel.

Figure 5:
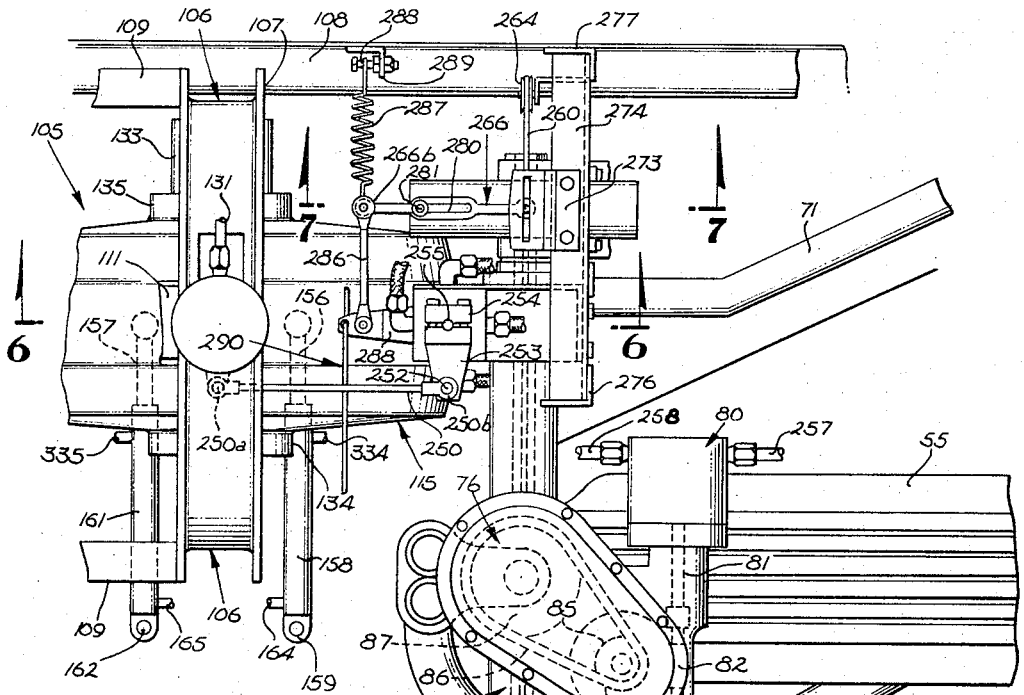
FIGURE 5 is an enlarged partial plan view similar to FIGURE 3 illustrating the linkage for controlling the steering motor in accordance with gimbal displacement.

The steered front wheel 55 of the vehicle is free-running and is mounted on a double caster arm 56; the outer ends 57 of the arm being formed into the support shaft for the front wheel. The other ends 58 of the caster arm are rigidly secured to ends 59a and 60a of spaced bars 59 and 60 which are supported at ends 59b and 60b by enlargements 61 and 62, respectively, on a mounting shaft 63 (see FIGURES 9 and 10). A driving pin 65 extends through ends 59b, 60b and through enlargement projections 61 and 62 and through the mounting shaft 63. The lower end of pin 65 carries a pulley 66 and the upper end of pin 65 contains a square socket 66' for receiving a square drive pin 67. The lower end of pin 65 is splined at 68 so that rotation of the pin 65 by drive pin 67 will cause the bars 59 and 60 to rotate thereby turning caster arm 56 and front wheel 55. Referring to FIGURES 5 and 8, the vehicle frame comprises frame arms 70 and 71 having enlarged ends 70a and 71a, respectively, which receive the reduced ends 63a and 63b of shaft 63. The ends 70a and 71a contain suitable bearings for rotatably supporting the ends of the shaft 63 so that the caster arm 56 and the front wheel can move up and down relative to the car frame.

The drive pin 67 is rotatably driven by steering unit 75 which comprises a casing 76 rigidly secured to the shaft 63 by means of brackets 77 and 78 (see FIGURES 9 and 10). A hydraulic steering motor 80 is attached to casing 76 and has a drive shaft 81 (see FIGURE 5) terminating in a worm gear 82 which meshes with gear 83. The gear 83 is rotatably supported by the casing and has a shaft 84 connecting with a sprocket 85 around which passes a chain 86. The chain also passes around a larger sprocket 87 from which projects the driven pin 67. Thus, rotation of worm gear 82 by motor 80 will rotate gear 83 and drive chain 86 to cause pin 67 to move the bars 59 and 60 and the caster arm 56. Since the steered front wheel is forward of its pivot pin 67, the front wheel caster is negative. While a hydraulic gear motor of standard construction is utilized to steer the front wheel, any other suitable type of steering motor, such as an electrical or mechanical motor or actuator can be employed for this purpose.

In order to spring mount the front wheels, the frame members 70 and 71 carry lugs 90 and 91 which engage one end of coil springs 92 and 93, respectively, (see FIGURES 3 and 5). The other end of spring 92 rests in a seat 95 secured by a bracket 96 to splined end 97 projecting from end 63a of shaft 63 and end nut 98 holds the bracket 96 on the splined end 97. In a similar manner, spring 93 rests in a seat 100 secured by a bracket 101 to splined end 102 projecting from end 63b of shaft 63 and the bracket is held on the splined end 102 by a nut 103 (see FIGURE 8). Thus, the brackets 96 and 101 will move with the wheel 55 as it moves up and down and the springs will serve to continually bias the wheel 55 in a downward direction. Suitable shock absorbers (not shown) can be incorporated in the springs in a conventional manner.

A gyro stabilizing unit 105 of assembly 36 comprises cylindrical gyro frame 106 which is rigidly secured to vehicle frame tube 108 by welding at location 107. In addition, a U-shaped frame support member 109 is connected to opposite sides of the gyro frame 106 and this member is supported by a bracket 110 (see FIGURE 3) which is welded to a horizontal frame member 111 extending from the firewall 112 to connect with the top of the frame 106. Obviously, additional frame members can be incorporated to provide the required mounting rigidity for the gyro frame.

Referring to FIGURE 12, the rigid gyro frame 106 rotatably supports a gyro gimbal 115 having upper and lower shafts 116 and 117 which carry bearing structures 118 and 119, respectively. The gyro frame has upper and lower stub shafts 120 and 121 fixed thereto by screws 122 and the ends 120a and 121a project into the bearing structures 118 and 119, respectively. The stub shaft 120 contains a passage 125 and a similar passage 126 is contained in stub shaft 121. Passage 125 connects with passage 127 in shaft 116, and passage 126 connects with passage 130 in shaft 117. Therefore, hydraulic fluid supplied to passage 125 through conduit 131 can flow, through the axis of the bearing 118, to a passage 128 which connects with hydraulic motor 133 mounted in projection 135 on the gimbal 115. The shaft 141 of motor 133 passes through an opening in gimbal 115 containing bearing 142 and is keyed to shaft 143 of gyro rotor 139 by means of key 144. Rotor shafts 138 and 143 are attached to a solid central web 145 which supports the gyro ring 146 comprising the major mass of the gyro rotor 139. Shaft 138 is revolvably mounted in bearing 137 supported by the gimbal. A counter-weight 132 is attached to the gimbal projection 134 opposite to the motor 133 to balance the gimbal, it being understood that the counter-weight 132 may be replaced by another hydraulic motor similar to motor 133. The motor 133 exhausts through passages 151, 126 and 152.

Figure 4:
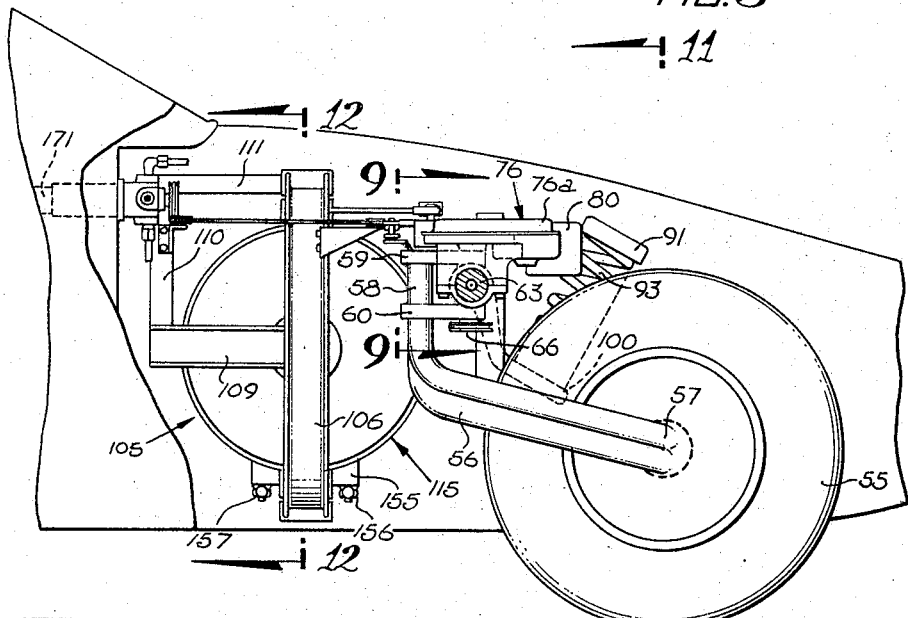
FIGURE 4 is a partial section along line 4—4 of FIGURE 3 illustrating the supporting structure for the gyro and for the front wheel.

Referring to FIGURES 4 and 5, the gyro gimbal 115 has a bottom block 155 projecting therefrom and an actuator arm 156 is pivotally attached to one side of the block while an actuator arm 157 is pivotally attached to the opposite side of the block. The actuator arm 156 is moved by a low friction piston type actuator motor 158 which is pivotally connected by pin 159 to the frame 160 for the engine 35 (see FIGURE 3). In a similar manner, the actuator arm 157 is driven by low friction piston type actuator motor 161 which is pivotally connected by pin 162 to the engine frame 160. Fluid is supplied to the motors 158 and 161 through passages 164 and 165, respectively (see FIGURE 5). Under normal operating conditions, substantial fluid pressure is not applied to the actuators 158 and 161 and because of the low friction construction of these actuators, normally they will not interfere appreciably with the movement of the gimbal. However, when it is desired to torque the gyro gimbal in order to bank the vehicle, as will be later described, pressure can be applied to either one of the actuators to torque the gimbal in the desired direction about the gimbal axis. The torquing motors can comprise any suitable actuator or motor, either electrical, hydraulic or mechanical.

The supply of fluid under pressure to the torquing motors 158 and 161 is controlled by valve 170 (see FIGURES 13–17). Valve 170 has an input shaft 171 which connects with steering shaft 172 of steering wheel (roll controller) 34 and the shaft is supported by a conventional steering column 172' (see FIGURE 2). The input shaft 171 is normally centered in the valve casing 173 by a centering spring 178 having ends 178a and 178b on opposite sides of a housing projection 173a and of a pin 173b (see FIGURES 13 and 17). A collar 179 is fixed to shaft 171 by a pin 179a and pin 173b projects into collar 179 so that spring 178 centers the input shaft 171 when no steering force is applied thereto. A disc 179b is turned with collar 179 by pin 173b and the disc 179b contains a notch 179c for projection 173a so as to limit the angular movement of the input shaft in both directions relative to the valve casing 173.

Valve casing 173 contains a follow-up sleeve 174 which is connected at end 174a to a pulley 175 by a key 176 and the pulley is held on end 174a by ring 177. The casing 173 also contains four ports 180–183 with ports 180 and 182 arranged in one transverse plane and ports 181 and 183 in a second transverse plane spaced from the first plane (see FIGURE 14). Fluid under pressure enters the port 180 and exhausts through the port 182. Port 181 connects with torquing motor 158 through line 164 and port 183 connects with torquing motor 161 through line 165. The follow-up sleeve 174 has a first semi-circular manifold groove 190 and a second semi-circular manifold groove 191 (see FIGURE 13). These two grooves are separated by projections 192 and 193 extending outwardly to the casing 173 so that grooves 190 and 191 are separated from one another (see FIGURE 14). The fluid from passage 180 is introduced to groove 190 and then flows through opening 194 in sleeve 174 into the space 195 within the follow-up sleeve 174. Space 195 is separated from space 196 within the sleeve by a valve spool 200, which comprises a triangular wedge 201 terminating in end surfaces 202 and 203. Space 196 is connected to exhaust passage 182 through opening 197.

A second set of semi-circular manifold grooves 206 and 207 in sleeve 174 are spaced from the manifold grooves 190 and 191 by the seal 207a and the grooves 206 and 207 are separated from one another by extension 208 and 209. As illustrated in FIGURES 14 and 15, the grooves 206 and 207 are displaced 90 degrees from the grooves 190 and 191. End rings 204 and 205 on the valve spool 200 are located at the opposite ends of the wedge 201 and span the two sets of manifold grooves. The sleeve 174 contains a first set of three openings 210, 211 and 212 which open into manifold groove 206 and contains a second set of three openings 213, 214 and 215 which open into manifold groove 207. As illustrated in FIGURE 15, the manifold groove 206 connects with passage 165 and the manifold groove 207 connects with passage 164.

In operation, when the valve spool 200 is in the null or center position as illustrated in FIGURE 14, fluid flows from passage 180 into space 195 and then out the openings 210 and 213 into the annular manifolds 206 and 207 so that fluid is supplied equally to passages 164 and 165. At the same time, the ports 212 and 215 are open to connect the fluid to space 196 which in turn exhausts through the port 182. Thus no appreciable pressure will build up on the actuators 158 and 161 with the valve spool in its center position.

When it is desired to operate one actuator or the other, the valve spool 200 is rotated in the required direction. For instance, when rotated to the dashed line position of FIGURE 15, ports 212 and 213 are closed and fluid flows through ports 210 and 211 into manifold 206 and then to torquing actuator 161 through line 165. At the same time, passage 164 will remain open to space 196 through openings 214 and 215 so that torquing actuator 158 is connected to exhaust port 182 through opening 197. In the event the valve spool 200 is rotated in the opposite direction, line 164 would be supplied with fluid under pressure to energize torquing actuator 158 and line 165 would be connected to exhaust through port 182 so that the gimbal will be torqued in the opposite direction. Thus, when the valve spool 200 is in the center position, the fluid flow will be from the input port 180 to the output port 182 with no substantial pressure produced by the actuators 158 and 161 and the gimbal can rotate freely in the frame 106. However, when the spool 200 is rotated, a torquing force will be produced on the gimbal in a direction determined by the direction of rotation of the spool.

The spool 200 has an end extension 222 supported by bearing 223 within sleeve 174 and the extension is connected to steering shaft 171 by a shaft 224. The end of extension 222 is connected to shaft 224 by means of a floating coupling 225 which has a grooved end 226 fitted to the shaft 222 by lug 227 and has a cup end 228 fitting over the end of shaft 224 (see FIGURE 13). The coupling 225 has a lug 229 which is located in a groove 230 in shaft 224 and shaft 224 is rotatably mounted by needle bearing 231 on supporting cup end 228. Thus, the coupling 225 permits some misalignment between the shafts 222 and 224 to minimize binding of the spool 200.

The shaft 224 is surrounded by a coil spring 235 which has opposite ends 236 and 237 located in a groove 238 in follow-up sleeve 174 (see FIGURES 13 and 16). A rod 239 extends longitudinally through the groove 238 and into openings in the sleeve 174 at opposite ends of the groove 238 so that the rod 239 is rigid with the sleeve. A second rod 240 extends between openings in hub 241 and in cup end 228 and is normally located directly above the rod 239 by the ends 236 and 237 of spring 235 which are located on opposite sides of rods 239 and 240. The spring 235 serves to normally maintain the spool 200 centered within the follow-up sleeve 174 as illustrated in FIGURES 14 and 15. Shaft 224 extends into an opening in the end of steering shaft 171 and is secured thereto by pin 179a and a bearing 243 supports the end of the shaft 224. The bearing 243 is secured by a ring 244 which in turn is secured by snap ring 245 held by casing 173.

When the steering shaft 171 is rotated, it will turn the spool valve 200 relative to the follow-up sleeve 174 since the rod 240 will rotate with the shaft 171 and spread the ends of the spring 235 apart. The rod 239 will remain stationary with the follow-up sleeve during this initial movement. When an end of the spring 235 engages a side of groove 238, no further displacement of the spool relative to the sleeve can take place. Therefore, there is a limit to the maximum relative rotation between the spool and the sleeve and once the force on the steering wheel is removed, the spring 235 will center the valve by moving the spool and steering wheel back to the open center position. It is therefore apparent that movement of the steering wheel or roll controller 34 will move the valve spool 200 which in turn will control the actuators 158 and 161 to produce a torque on the gyro gimbal 115 in the selected direction. As will be later described, the application of a torquing force on the gyro gimbal will cause the vehicle to bank about its roll axis resulting in a turn in the direction of the bank.

In order to turn the steered front wheel of the vehicle as a function of gimbal precession, a link 250 is pivoted to the gimbal 115 by a pin 251 extending from the gimbal into the enlarged end 250a of the link (see FIGURES 5 and 12). The other enlarged end 250b of link 250 receives a pin 252 which is carried by blade 253 extending from a split member 254 attached to shaft 255 of the valve 256 (see FIGURE 18). The valve 256 is identical in construction with the valve 170 except that centering springs, such as springs 235 and 178 are not employed. Shaft 255 turns the spool 200' which directs the fluid received from passage 180' to the ports 210', 211', and 212' or to the ports 213', 214' and 215' in order to control the flow of fluid to the output passages 257 and 258 and to the output exhaust passage 182'. The follow-up sleeve 174' projects beyond the end of the valve casing 173' and carries a follow-up member 259 which is keyed to the follow-up sleeve by key 259'. The spool 200' is supported within the follow-up sleeve by the bearings 221' and 223'. Passages 257 and 258 connect with the hydraulic motor 80 which drives the steering mechanism 75 for the front wheel 55. When the gyro gimbal precesses in one direction, the motor is driven in a direction to turn the vehicle in one direction and when the gyro gimbal precesses in the other direction, the motor 80 is driven in the reverse direction to turn the vehicle in the opposite direction.

With the rotor 139 spinning in the preferred direction (the direction indicated in FIGURE 20) upon banking the vehicle to the right, gravity will precess the gimbal counterclockwise and move the arm 250 to the right in FIGURE 5 and the valve spool 200' in a direction to introduce fluid to line 257 which will rotate motor 80 in a direction to steer the front wheel 55 to the right. Upon banking the vehicle to the left, gimbal precession will move the link 250 and valve 256 will introduce fluid to passage 258 to drive the motor 80 in a direction to steer the front wheel to the left. Thus, it is apparent that the front wheel 55 will be steered by gyro precession in the direction of vehicle bank.

In order to turn the front wheel as a function of gimbal displacement, a follow-up cord 260 is rotated by the pulley wheel 66 which is rotated by the steering motor when the front wheel is rotated about its steering axis (see FIGURE 10). One end of the cord 260 is secured to the pulley 66 and passes over a pulley wheel 261 supported on an arm 262 attached to bracket 96 (see FIGURE 5). The cord then extends through the center opening 263 in the shaft 63, through opening 263' in pin 65 and around pulley wheels 264 and 265 (see FIGURE 8) which are supported by brackets connected to upright frame member 267 attached to frame tube 108. The cord 260 then connects with the end 266a of a movable linkage arm 266 of a follow-up linkage (see FIGURE 7). The cord 260 terminates in a rigid eyelet 270 which receives a pin 271 projecting upwardly from end 266a through a slot 272 in a bracket 273 which is secured to support 274 by bolts 275 (see FIGURES 5 and 7). The support 274 is secured to upright frame members 276 and 277 so that the bracket 273 is rigid with the vehicle frame. The arm 266 contains a center slot 280 which receives a pin 281 having an upper cap 282 which is wider than the slot. The pin 281 extends from a surface 283 of a post 284 so that the arm 266 is supported by the post 284 while it is permitted to move relative to the post. The other end 266b of arm 266 is connected by pin 285 to one end of a link arm 286 (see FIGURE 5). End 266b is also connected to coil spring 287 anchored to a pin 288 which is secured to the vehicle frame by a bracket 289. Thus, the spring 287 moves the arm 266 in one direction and the cable 260 pulls the arm in the other direction. It is apparent that movement of the cable 260 by the follow-up pulley 66 will pivot the linkage arm 266 about the pin 281 and cause positive movement of the link 286.

Figure 6:
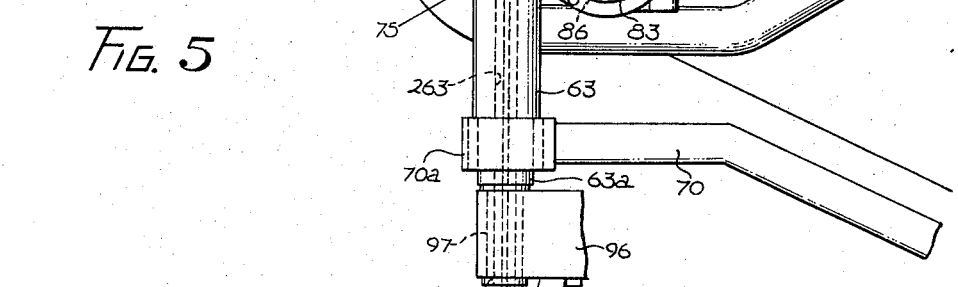
FIGURE 6 is a partial vertical section along line 6—6 of FIGURE 5 showing the valve controlled by gimbal displacement.

The other end of link 286 is pinned to the follow-up arm 288 which is connected to follow-up member 259 and sleeve 174' of the valve 256 (see FIGURES 5 and 6). After movement of the spool 200' of valve 256 by the gyro gimbal, the resulting movement of the wheel 55 will move the follow-up sleeve 174' until the wheel 55 assumes a position which will center the valve and result in termination of the movement of the wheel. Thus, the wheel 55 will move as a function of the displacement of gimbal 115.

A second follow-up mechanism comprises a continuous cord 290 which is connected to link arm 286 through the member 288 at point 291 (see FIGURE 3). The cable 290 passes around a plurality of pulleys 292 which are supported by brackets attached to the vehicle frame and the cable wraps around the follow-up pulley 175 of the valve 170. Thus, the wheel 55 is also connected through pulley 175 to the follow-up sleeve 174 of the valve 170 and the valve 170 will be centered when the front wheel reaches a position corresponding to the position of the steering wheel. When the steering wheel is released, the spring 178 will move the valve spool 200 towards its center position in casing 173 which will cause valve 170 to produce a torque on the gimbal in a direction to center the gimbal, the steered front wheel and the steering wheel. Thus, the position of the steering wheel 34 will reflect the position of the front wheel and the gimbal.

It is desirable to adjust the follow-up linkage so that precession of the gimbal results in small movement of the front wheel at high vehicle speeds and large movement of the front wheel at low vehicle speeds. This prevents the vehicle from executing too severe a turn at high speeds. Referring to FIGURE 7, the rod 284 is connected to a piston rod 300 which in turn is connected to piston 301 located within cylinder 302. A spring 303 biases the piston to the left in FIGURE 7 in order to bias the pin 281 toward the left end of slot 280. The enlarged extension 300a of piston rod 300 provides a space 304 in the end of the cylinder which is connected by passage 305 to a pump 306 driven by the engine transmission. The passage 305 is connected to exhaust through line 295 containing an orifice or restriction 296, and the spring end of cylinder 302 is connected to exhaust by drain line 297. The pump is driven by the transmission at a speed which is proportional to the speed of the vehicle so that it develops a pressure in space 304 which is approximately proportional to the square of the vehicle speed. As the pump pressure increases as a function of vehicle speed, the piston 301 will be urged to the right in FIGURE 7 moving the pin 281 toward the other end of slot 280 and toward the position shown by the phantom lines of FIGURE 7. In order to center valve 256, a greater movement of wheel 55 will be required when the pin 281 is in its full line position of FIGURE 7, than when the pin is in its dotted line position. In other words, at high vehicle speeds the valve 256 is centered by less movement of the wheel 55 than is required to null the valve at low speeds and this prevents the vehicle from being placed in too severe a turn at high speeds for a given gimbal displacement. Also, at high speeds, inevitable unwanted gimbal oscillations produce negligible displacement of the steered front wheel.

The operation of the gyro stabilization system and steering system for the vehicle will be described in connection with FIGURES 20–22 in which the major elements are shown diagrammatically and operate the same as described above. In FIGURE 20, the position of the major parts are shown during straight travel of the vehicle while in FIGURE 21, the major parts are in a position assumed during a turn to the left. The gyro gimbal axis 308 is substantially perpendicular to the roll axis, which is indicated as a line 309 on the supporting surface 310 between the two wheels, and the gimbal axis 308 is substantially parallel to the longitudinal centerplane of the vehicle. The spin axis of the gyro rotor is substantially perpendicular to the longitudinal centerplane when the steered front wheel is in its center position about its pivot or caster axis; that is, the position in which the vehicle tends to travel in a straight line. In this position, the displaceable axis (the axis of the front wheel displaceable about the caster or steering axis) about which the front running wheel revolves is parallel to the fixed axis about which the rear running wheel revolves. As indicated by the arrow on the rotor, the gyro rotor is spinning in a direction opposite to the rotation of the wheels during forward travel.

To execute the turn shown in FIGURE 21, the steering wheel 34 is moved counterclockwise as viewed from the rear of the vehicle and this movement causes the valve 170 to actuate the torquing motor 158 which produces a torque on gimbal 115 in a counterclockwise direction as viewed from above and thereby banks the vehicle to the left. Thereafter, the force of gravity becomes operative upon the gyro and precesses the gimbal clockwise in the direction of the arrow 311. In other words, when the roll equilibrium of the vehicle is disturbed, the gimbal precesses, according to the well-known laws of gyroscopic precession, in the direction opposite to the direction in which the vehicle is turning. The precession of the gyro gimbal will continue and will increase the turn rate of the vehicle until the component of centrifugal force exceeds the gravitational component acting on the vehicle about its roll axis by an amount just sufficient to precess the gyro gimbal in space at the same rate the vehicle is turning. When gravity acting in the direction of arrow 314 is exactly canceled by centrifugal force acting in the direction of arrow 315, the vehicle will be in apparent vertical as illustrated by line 316. However, during the turn, the vehicle banks short of apparent vertical to the position indicated by line 317 or, in other words, underbanks during the desired turn. Until the gimbal is precessing in space at the rate of turn of the vehicle, there is relative movement between the gimbal and vehicle, and wheel 55 continues to pivot about its caster axis to increase the turn rate. The follow-up linkage will cause the steered front wheel to pivot according to gimbal displacement but in a direction opposite to that in which the gimbal pivots. When the roll controller 34 is released or manually returned toward its center position to erect the vehicle from its left bank, the gimbal will be torqued in a direction to erect the vehicle and center the front wheel about its caster axis.

Conversely, in order to bank and turn the vehicle to the right, the roll controller 34 is moved clockwise, which energizes torquing motor 161, and torques the gimbal in a clockwise direction. This results in a right bank, precessing the gimbal counterclockwise or opposite to the direction of turn. This precession continues until it is stopped relative to the vehicle when a turn rate appropriate to the bank angle of the vehicle is attained.

In general, when the gyro vehicle is in motion it is also self-balancing. If side forces due to gusty winds or other disturbances should torque the vehicle about its roll axis and precess the gimbal, the related displacement of the front wheel about its caster axis is always in a direction to produce a moment to oppose the unwanted disturbing moment. This opposing or restoring moment is the result of negative caster or centrifugal force or both. When the vehicle is moving forward, any displacement of the gyro gimbal and the front wheel will be in a direction to equilibrate the roll moment causing the gyro displacement. Also, when the vehicle is stationary, a roll moment is applied according to gimbal and front wheel displacement because of negative caster. It will be apparent from FIGURE 22 in which the vehicle is shown diagrammatically that, because of negative caster, the center of gravity of the vehicle is moved to the left when the front wheel is moved to the right and to the right when the front wheel is moved to the left. In an orientation, for instance, in which the rotor is spinning in a direction indicated by the arrow on the rotor in FIGURE 22, an unwanted roll moment in the direction of the arrow 318 will precess the gyro gimbal 115 to the position indicated by the phantom lines. In this phantom position, a moment due to gravity is effected about the roll axis of the vehicle in the direction of arrow 319 as a result of a shift of the center of gravity of the vehicle relative to the roll axis. In other words, because of negative caster, whenever the front wheel is displaced in one direction, a roll moment due to gravity is produced in the opposite direction. Also when such a vehicle is in motion, whenever its steered front wheel is moved in one direction a roll moment due to centrifugal force results in the other direction. Therefore, when the vehicle is in motion, the roll moment due to centrifugal force and the roll moment due to negative caster are in the same direction and are augmentative. At a high speed, a small displacement of the front wheel will produce a severe roll moment due to centrifugal force. On the other hand, the small displacement of the front wheel under such circumstances will result in an almost negligible rolling moment due to negative caster. However the roll moment produced by centrifugal force at any substantial speed of the vehicle is adequate to maintain the vehicle in equilibrium. At very low speeds it is necessary to displace the front wheel considerably, to produce a severe rolling moment by centrifugal force. On the other hand, any substantial movement of the steered front wheel will provide a moment about the roll axis adequate to maintain the vehicle in equilibrium, and even when the vehicle is stationary, the roll moment due to caster will always be adequate to maintain the vehicle in equilibrium.

When the vehicle is moving backwards, the front wheel trails and becomes the trailing wheel and when this trailing wheel is turned to the right, the vehicle turns to the left and the roll moment due to centrifugal force is to the right. That is, the roll moment due to centrifugal force is in the direction the trailing wheel is steered. Also when the vehicle is steered by the trailing wheel, the trailing wheel caster becomes positive rather than negative. Therefore when the trailing wheel is steered to the right the roll moment due to positive caster is to the right or in the direction of the centrifugal force moment. Thus regardless of whether or not the vehicle is moving and regardless of the direction in which it may be traveling, a roll moment is produced upon a displacement of the steered wheel, in a direction to maintain the equilibrium of the vehicle.

Thus, in a vehicle steered by its front wheel, the caster of the front wheel should be negative, and in a vehicle steered by its rear wheel the caster of the steered rear wheel should be positive in order to render the roll moments due to caster compatible with the roll moments due to centrifugal force. Also, if a vehicle is steered by both its front and rear wheel, front wheel caster should be negative and rear wheel caster should be positive. This arrangement, in addition to rendering roll moments due to caster compatible with roll moments due to centrifugal force, simplifies the construction of the vehicle in that the steering or caster axis is inboard regardless of whether or not front wheel steering, rear wheel steering, or a combination of front and rear wheel steering is employed. While the above described steering or caster suspension is preferred, neutral caster or even caster opposite to that described above, may be employed with little or no adverse effect on the stability of the vehicle when it is traveling at high speed, since the effect of caster is negligible at high speed compared to the effect of centrifugal force at high speed. When such caster is employed, however, the driver must supply a corrective roll moment when the vehicle drifts in roll from an equilibrium position since a corrective roll moment is not automatically applied to the vehicle at zero and near zero speed. However, the driver upon observing a tilt of his vehicle can restore the vehicle to an upright position by proper manipulation of the roll controller.

When the vehicle engine is off for a considerable length of time, the gyro rotor will lose speed and it is desirable to have side skids which can be lowered on opposite sides of the vehicle at any time to maintain the vehicle upright. Referring to FIGURES 1 and 2, side skids 320 and 321 are shown in the up position and in the down position by phantom lines. Each of the skids are rotatably supported on the supporting tube 48 and the skids are controlled by separtae hydraulic actuators 322 and 323 (see FIGURE 23). The valve 324 for the side supports can be manually operated for up or down movement.

The hydraulic system for the gyro vehicle is schematically shown in FIGURE 23. The engine 35 drives pump 29 which supplies fluid to gyro motor 132 and this motor exhausts through line 152 to the three position, four way valve 324 which controls the side skids or packing gear. This valve controls fluid flow through lines 330 and 331 to the motors 322 and 323 and exhausts to line 180' which leads to the three position, four way valve 256. When the valve 324 is shifted to the right, the valve passages are aligned to lower the skids and when shifted to the left, the passages are aligned to hold the skids in raised position. When the valve 324 is in its center position fluid flows directly to line 180'. The steering motor 80 is connected to the valve 256 by lines 257 and 258, and fluid exhausts from valve 256 to valve 170 through line 182'. The valve 256 is shifted to either desired passage alignment by the gimbal actuated arm 250, in order to drive steering motor 80 clockwise or counterclockwise. When the valve 256 is in its center position fluid flows directly to line 182'; bypassing steering motor 80.

Valve 170 is connected to the actuator motors 158 and 161 by lines 164 and 165, respectively, and fluid leaking past the motor pistons drains through lines 334 and 335 to the exhaust line 336 which returns to the tank 326. Also, the valve 170 is connected to the exhaust line 336 through the line 182. When the valve 170 is shifted to the right (by counterclockwise movement of steering wheel 34) the valve passages are aligned to pressurize motor 158 through line 181 and to connect motor 161 to the exhaust line 336 through lines 183 and 182. When the valve is shifted to the left (by clockwise movement of steering wheel 34) the valve passages are aligned to pressurize motor 161 through line 183 and to connect motor 158 to exhaust line 336 through lines 181 and 182. When the valve 170 is in its center position, fluid flows directly to exhaust line 182 bypassing the torquing actuators 158 and 161. A relief line 337 includes relief valves 338 and 339 on opposite sides of the gyro motor to protect the system in the event of blockage of an exhaust passage. A manually operated starting valve 340 is located in a secondary by-pass line to exhaust the pump to the tank during engine starting and remove the pump load. Also, a check valve 341 can be located in a bypass line 342 to permit the gyro motor to function as a pump in case of failure of the engine 35. The intake of pump 306 of the gain control system is connected directly to the line 336 and fluid returns to the line 336 through orifice 296.

Second embodiment

Figure 24:
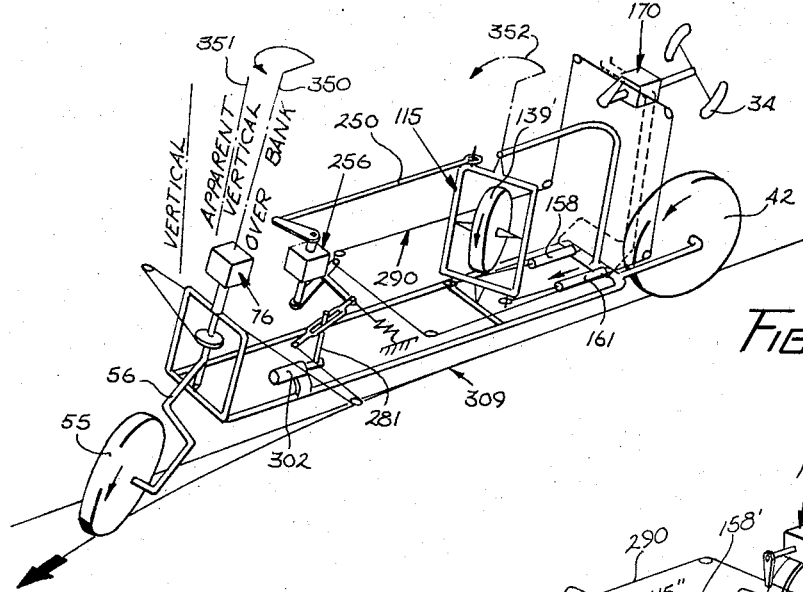
FIGURE 24 is a diagrammatic illustration of a second form of the invention in which the gyro rotor spins in the same direction as movement of the running wheels of the vehicle during forward movement.

In a second embodiment of the invention shown in FIGURE 24, the gyro rotor spins in the same direction that the wheels rotate in forward motion as illustrated by arrow on the rotor. In order for the gyro to be precessed at the same rate of turn as the vehicle, it is necessary for the vehicle to overbank into a position such as is illustrated by line 350. In other words, the vehicle must bank beyond the apparent vertical position 351 in order to produce a gravity component which will precess the gyro gimbal at the vehicle's rate of turn.

In FIGURE 24, the vehicle is shown in a left bank. In order to produce such a bank, a torque is produced on the gimbal 115 by the motor 161 in a clockwise direction (viewed from above) which will cause banking of the vehicle in a direction to produce a left turn. Gravity acting on the vehicle about its roll axis during the turn will cause the gimbal to precess in a counterclockwise direction as indicated by arrow 352. In other words, the vehicle overbanks or banks past apparent vertical since the gyro rotor is spinning in the direction of the arrow on the rotor. On the other hand, in the first embodiment, the vehicle underbanks or banks short of apparent vertical during a turn since the rotor spins in the opposite direction. As previously explained, the direction of spin of the gyro rotor in FIGURE 24 is preferred for rear heavy vehicles. However, it is preferred that the vehicle be front heavy with the direction of rotor spin as shown in FIGURE 21, so that the vehicle will underbank to reduce the maximum bank angle of the vehicle.

Third embodiment

A third embodiment of the invention is illustrated diagrammatically in FIGURE 25 wherein the steering wheel 362 drives the sector gear 350 to torque the gimbal 115' housing rotor 139'. The linkage 250' is connected to the gimbal and actuates the valve 256 which in turn controls the steering mechanism 76 to move the caster arm 56 supporting the front wheel 55 as in the other embodiments. A follow-up linkage 266' is connected to the caster arm 56, as in the other embodiments, and moves to center the follow-up sleeve of valve 256. However, the follow-up cord 290 of the first embodiment is not necessary in the third embodiment since the gyro gimbal 115' is geared to the steering wheel 362 in order to provide means for manually torquing the gimbal. Because of the gear reduction between steering wheel 362 and gear 350, considerable mechanical advantage is provided for manually torquing the gimbal.

Fourth embodiment

A fourth embodiment of the invention is illustrated in FIGURE 26 wherein the steering wheel 362 provides manual means for torquing the gimbal 115' through the gear sector 350 and the gimbal is directly connected to the front wheel 55 by means of a first pinion gear 380 directly connected to the gimbal and meshing with a sector gear 381 directly connected to the caster arm 56. The gyro gimbal is torqued by the steering wheel 362 to initially bank the vehicle and thereafter the vehicle will assume a bank angle in the direction of the turn which will be maintained at a constant rate when the centrifugal force moment precesses the gyro gimbal at the same rate of turn as the vehicle.

Fifth embodiment

Figure 27:
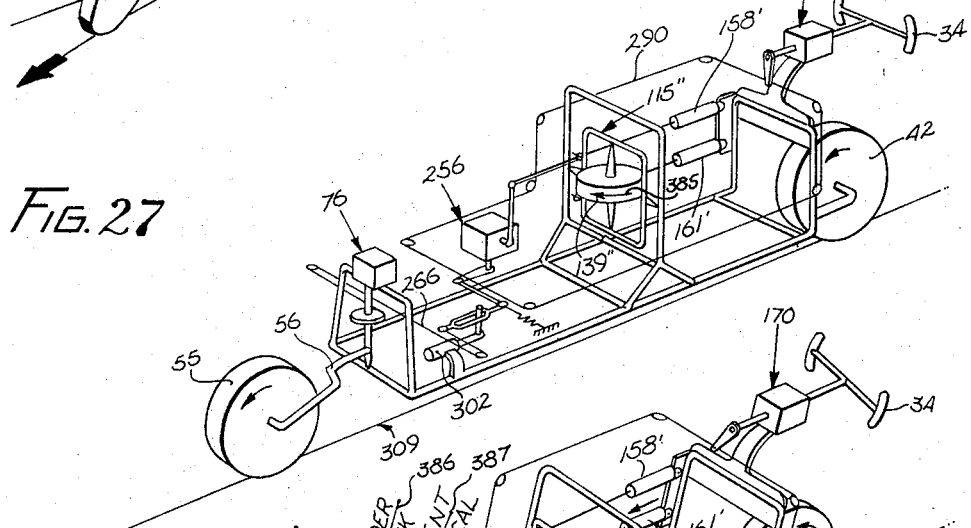
FIGURE 27 is a diagrammatic illustration of a fifth form of the invention in which the gimbal axis is substantially perpendicular to the longitudinal centerplane of the vehicle.
Figure 28:
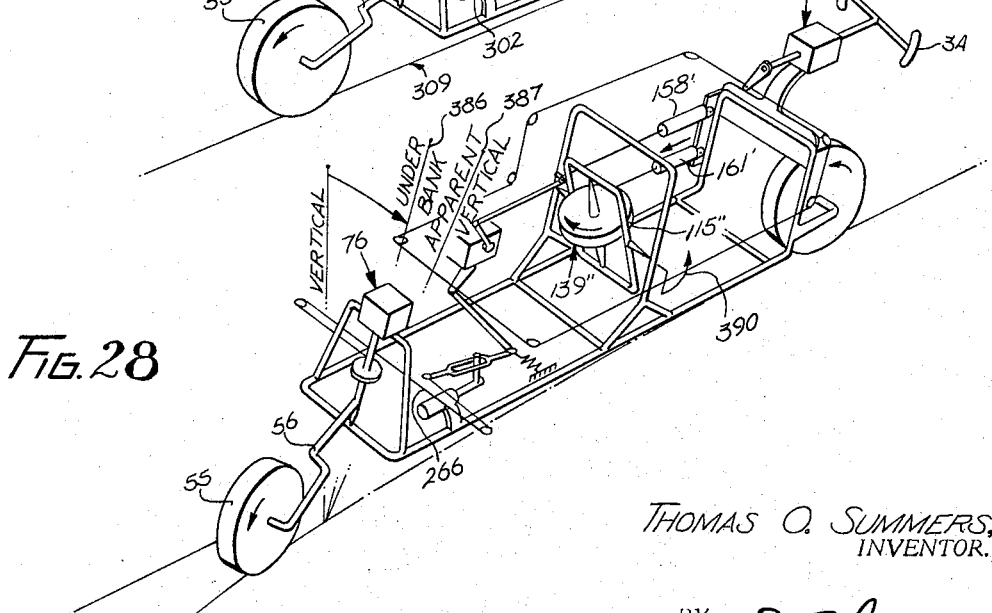
FIGURE 28 is a diagrammatic illustration of the vehicle of FIGURE 27 in a left turn.

While the preferred orientation of the gimbal axis is perpendicular to the roll axis and parallel to the longitudinal, vehicle center plane as shown in the first embodiment, it is understood that the stabilization system of the present invention will be operative when the axis of gimbal 115" is perpendicular to the roll axis and also perpendicular to the center plane as illustrated diagrammatically in FIGURES 27 and 28. Since the rotor is spinning in a clockwise direction as indicated by arrow 385, the vehicle will underbank in a left turn to position 386 and will overbank in a right turn. As illustrated in FIGURE 28, the gimbal is precessed in a counterclockwise direction by the roll moment due to gravity as indicated by arrow 390, after a left bank is produced by torquer 161' acting below the gimbal axis. The vehicle will bank short of apparent vertical line 387, in a left turn since a centrifugal force moment is necessary to precess the gimbal in the direction of the turn. However, when the vehicle executes a right turn, it will overbank since a gravity moment is necessary to precess the gimbal in the direction of turn. Should the direction the gyro rotor spins be reversed, the vehicle would overbank in a left turn and underbank in a right turn.

The present invention is operative with the gyro assembly mounted at various angles between the two positions illustrated in which the gyro spin axis is either vertical or horizontal and normally at right angles to the vehicle roll axis. Also, it is believed apparent that both the spin axis and the frame axis of the gyro assembly may be displaced from the illustrated normal right angle relation and the gyro still will be operative to stabilize the vehicle but, of course, the spin axis must not be permitted to parallel the vehicle roll axis.

Since the precession rate of the gyro about its gimbal axis is inversely proportional to the angular momentum of the gyro rotor, the angular momentum should be as great as practicable to increase roll resistance.

It will be understood that gimbal stops (not shown) may be provided in the various embodiments to limit the angular movement of the gyro gimbal when the gimbal has moved through an angle at which it is no longer effective in opposing roll moments. The displacement of the gyroscope of the present invention is, of course, a function of the time integral of the various roll moments acting thereupon. To provide maximum gyroscopic resistance to roll moments, it is therefore preferred that the gyro gimbal be permitted to move through as large an angle as practicable. Accordingly, an arrangement is preferred whereby the gimbal, in effecting a given roll moment by front wheel steering, is allowed to precess to the maximum safe angle throughout the speed range of the vehicle. To achieve such an arrangement, the gain control changes the ratio of steered wheel movement to gimbal movement according to the square of the vehicle speed, so that for a given gimbal displacement the resulting roll moment will be approximately constant throughout the entire speed range of the vehicle.

The configuration of the vehicle can be modified depending upon the desired use of the vehicle and one or more wheels can be replaced by other support means. Any suitable type of power source can be used to drive the vehicle gyro motor and the other motor driven devices, and it is apparent that any suitable speed responsive means can be used to adjust the follow-up linkage between the front wheel and the gimbal in accordance with vehicle speed. While the linkage means for controlling torque on the gimbal and for steering the front wheel by the gimbal are disclosed as hydraulic, it is obvious that these control linkages could be mechanical, electrical or any mechanical, hydraulic or electrical combination. Various other modifications are contemplated by those skilled in the art without departing from the spirit and scope of the invention.

What is claimed is:

1. A gyro vehicle comprising:
   means forward and means rearward of the vehicle center of gravity for supporting the vehicle for translational movement over a support surface;
   said vehicle support means including means providing a longitudinal roll axis about which said vehicle has angular freedom;
   a gyro gimbal mounted on the vehicle for freedom of angular movement about a gimbal axis;
   a gyro rotor rotatably mounted in said gimbal for rotation about a rotor axis, said gimbal axis and said rotor axis being positioned on said vehicle for precession of said gimbal about said gimbal axis in response to torque on said vehicle about said roll axis;
   steering means responsive to the position of said gyro gimbal about said gimbal axis for steering one of said vehicle support means; and
   means for selectively applying a torque to said gimbal about said gimbal axis to precess said vehicle about said roll axis.

2. A vehicle as defined in claim 1 wherein said vehicle roll axis is spaced below the center of gravity of said vehilce.

3. A vehicle as defined in claim 1 wherein said steering means comprises means operatively connecting said gimbal and said one steered support means for producing a mechanical advantage of said gimbal over said support means.

4. A vehicle as defined in claim 1 wherein:
   said steering means comprises a steering motor responsive to gimbal position for positioning said one steered support means; and
   a source of energy operatively connected with said steering motor for operating said motor.

5. A vehicle as defined in claim 1 wherein said steering means includes means for controlling the lateral acceleration of said vehicle and torque due to said lateral acceleration on said vehicle about said roll axis.

6. A vehicle as defined in claim 1 wherein said steering means includes means for laterally displacing the vehicle center of gravity with respect to said roll axis to produce a gravitational torque on said vehicle about said roll axis.

7. A vehicle as defined in claim 6 wherein said means for producing lateral displacement comprises caster means connecting said one steered support means to said vehicle.

8. A vehicle as defined in claim 7 wherein said caster means provides negative caster for said one steered support means.

9. A vehicle as defined in claim 1 wherein said gimbal axis is substantially at right angles to said roll axis.

10. A vehicle as defined in claim 1 wherein said vehicle support means comprises wheels locating said roll axis substantially in the longitudinal centerplane of the vehicle, said one steered support means being one of said wheels.

11. A vehicle as defined in claim 10 wherein said gimbal axis lies in a plane substantially parallel to said centerplane of said vehicle.

12. A vehicle as defined in claim 11 comprising means for spinning said gyro rotor in a direction opposite to the direction of rotation of said wheels during forward motion of said vehicle.

13. A vehicle as defined in claim 12 having means including a steering motor responsive to gimbal position for moving said one steered support means in a direction opposite to the direction of said angular movement of said gimbal.

14. A vehicle as defined in claim 11 having:
   means for spinning said gyro rotor in the same direction as the direction of rotation of said wheels during forward motion of said vehicle; and
   means including a steering motor responsive to gimbal position for moving said one steered support means in the direction of said angular movement of said gimbal.

15. A vehicle as defined in claim 10 wherein said gimbal axis is substantially perpendicular to said centerplane of said vehicle.

16. A vehicle as defined in claim 10 having means for driving at least one of said wheels to move said vehicle.

17. A vehicle as defined in claim 10 wherein said steering means comprises:
   caster means for pivotally connecting said one steered wheel to said vehicle.

18. A vehicle as defined in claim 17 wherein said one steered wheel comprises said forward support means of said vehicle, said caster means comprising a caster arm extending forwardly to negatively caster said steered wheel.

19. The vehicle defined in claim 1 comprising means responsive to the speed of the vehicle for varying the steering ratio between said gimbal and said steering means.

20. A vehicle as defined in claim 1 wherein said torquing means comprises means connected to said gimbal for manually applying a torque thereto.

21. A vehicle as defined in claim 20 wherein said manual applying means comprises a steering wheel connected by a gear train to said gimbal.

22. A vehicle as defined in claim 1 wherein said one steered support means comprises a wheel, said torque applying means comprising manually operable means for applying torque to said gimbal and said steering means comprising linkage means between said gimbal and said one steered wheel.

23. A vehicle as defined in claim 22 wherein said manually operable means comprises manually controlled valve means and actuator means responsive to said valve means for selectively controlling the torque applied to said gimbal in either direction about the gimbal axis.

24. A vehicle as defined in claim 23 wherein said valve means comprises:
  a manually moved valve element;
  a follow-up element positioned by said one steered wheel; and
  means limiting the relative movement between said valve element and said follow-up element and for centering said valve element in said follow-up element when said valve element is released.

25. A vehicle as defined in claim 22 wherein said steering means comprises a steering motor operatively connected to said linkage means for moving said one steered wheel.

26. A vehicle as defined in claim 25 wherein said linkage means comprises:
  valve means moved by said gimbal for actuating said steering motor; and
  follow-up means comprising a follow-up member connected with said steered wheel and coacting with said valve means to position said steered wheel as a function of displacement of said gimbal.

27. A device as defined in claim 26 wherein said follow-up means comprises:
  means for changing the ratio between the movement of said steered wheel and the movement of said follow-up member to maintain a ratio between the steered wheel displacement and gimbal displacement varying approximately as the square of vehicle speed so that the turning radius of the vehicle at high speed is greater than at low speed.

28. A vehicle as defined in claim 27 wherein said ratio changing means comprises a pivot pin in a link of said follow-up means positioned substantially in accordance with the square function of vehicle speed to vary the amount of movement of said follow-up member as the same function of speed.

29. A gyro vehicle comprising:
  center-tracking, running wheels for supporting the vehicle for translational movement over a support surface and for roll freedom about a longitudinal roll axis;
  a gyro assembly having a gimbal mounted for rotation about a gimbal axis and a gyro rotor mounted in said gimbal for rotation about a rotor axis, said gimbal axis and said rotor axis being positioned on the vehicle for precession of said gimbal in response to torque on said vehicle about said roll axis;
  steering means responsive to the position of said gimbal about said gimbal axis for steering one of said wheels;
  power means for driving one of said wheels to propel the vehicle over the support surface and for driving said rotor about said rotor axis;
  means for selectively applying a torque to said gyro about said gimbal axis to precess the vehicle about said roll axis; and
  means responsive to the speed of said vehicle for controlling said steering means to vary the steering ratio between said gimbal and said steered wheel as a function of the speed of said vehicle.

30. A vehicle as defined in claim 29 wherein said steering means comprises:
  valve means controlled by said gimbal; and follow-up means connected between said valve means and said one steered wheel;
  said speed responsive means comprising means for varying the follow-up ratio of said follow-up means according to the square of vehicle speed.

31. A vehicle as defined in claim 30 wherein said steering means comprises a steering motor controlled by said valve means for moving said steered wheel.

32. A vehicle as defined in claim 31 wherein said follow-up means comprises a follow-up member coacting with said valve means to position said steered wheel as a function of displacement of said gimbal.

33. A device as defined in claim 32 wherein said follow-up means comprises:
  means for changing the ratio between the movement of said steered wheel and movement of said follow-up member to maintain a ratio between the steered wheel displacement and gimbal displacement varying approximately as the square function of vehicle speed so that the turning radius of the vehicle at high speed is greater than at low speed.

34. A vehicle as defined in claim 33 wherein said ratio changing means comprises a pivot pin in a link of said follow-up means positioned substantially in accordance with the square function of vehicle speed to vary movement of said follow-up member.

35. A gyro stabilized vehicle movable on a supporting surface comprising:
  means forward and means rearward of the vehicle center of gravity for supporting said vehicle for translational movement over a support surface;
  said vehicle support means providing a longitudinal roll axis about which said vehicle has angular freedom;
  one of said support means being displaceable to impose zero force against said vehicle about said roll axis when in its normal position and to impose centrifugal force against said vehicle about said roll axis when displaced from said normal position;
  a gyroscope including a rotor mounted on a rotor frame pivotally supported on said vehicle for angular movement about its pivot axis in response to forces torquing said vehicle about said roll axis;
  means controlled by angular movement of said rotor frame for positioning said one displaceable support means;
  said positioning means including a steering motor performing work in effecting said positioning;
  a source of energy for conversion by said steering motor into mechanical energy to perform said work; and
  means connected to said rotor frame for controlling said energy to displace said one displaceable support means in a direction to maintain equilibrium of said vehicle about said roll axis.

36. A vehicle as defined in claim 35 having means augmenting said energy source for converting kinetic energy stored in said rotor for emergency utilization by said motor.

37. A vehicle as defined in claim 35 wherein said rotor frame axis is substantially at right angles to said roll axis and lies in a plane substantially parallel to the longitudinal centerplane of said vehicle.

38. A vehicle as defined in claim 37 wherein said vehicle support means comprises wheels, said one displaceable support means being one of said wheels.

39. A vehicle as defined in claim 38 having means for spinning said rotor in the opposite direction said wheels rotate during forward movement of said vehicle, said positioning means moving said displaceable wheel in the opposite direction said rotor frame moves in response to a force torquing said vehicle about said roll axis.

40. A vehicle as defined in claim 38 having means for spinning said rotor in the same direction said wheels rotate during forward movement of said vehicle, said positioning means moving said displaceable wheel in the same direction said rotor frame moves in response to a force torquing said vehicle about said roll axis.

41. A vehicle as defined in claim 35 wherein said one displaceable support means is positioned according to the displacement of said frame in a changeable ratio, and means responsive to vehicle speed for changing said ratio.

42. A vehicle as defined in claim 41 wherein said ratio changing means changes said ratio substantially as a function of the square of vehicle speed.

References Cited

UNITED STATES PATENTS

| | | | |
|---|---|---|---|
| 991,485 | 5/1911 | Darrow | 74—5.22 |
| 1,236,030 | 8/1917 | Wilson | 180—21 |
| 1,362,024 | 12/1920 | McKee | 180—30 |
| 1,513,143 | 10/1924 | Welch et al. | 74—5.22 |
| 3,124,007 | 3/1964 | Swinney | 74—5.22 |
| 3,145,797 | 8/1964 | Taylor | 74—5.22 X |
| 3,277,840 | 10/1966 | Li | 105—145 |

KENNETH H. BETTS, *Primary Examiner.*